US006931178B2

United States Patent
Saccomanno

(10) Patent No.: US 6,931,178 B2
(45) Date of Patent: Aug. 16, 2005

(54) COUPLING A TAPERED OPTICAL ELEMENT TO AN OPTICAL FIBER

(75) Inventor: Robert J. Saccomanno, Montville, NJ (US)

(73) Assignee: Honeywell International Inc., Morristown, NJ (US)

( * ) Notice: Subject to any disclaimer, the term of this patent is extended or adjusted under 35 U.S.C. 154(b) by 50 days.

(21) Appl. No.: 10/752,397

(22) Filed: Jan. 6, 2004

(65) Prior Publication Data

US 2005/0031271 A1 Feb. 10, 2005

Related U.S. Application Data

(60) Provisional application No. 60/439,412, filed on Jan. 10, 2003.

(51) Int. Cl.[7] .................................................. G02B 6/26
(52) U.S. Cl. ............................. 385/43; 385/42; 385/39; 385/50; 385/51; 385/84; 385/86; 385/87; 385/66; 385/69; 385/70
(58) Field of Search ............................. 385/39, 42, 43, 385/50, 51, 31, 84, 86, 87, 66, 69, 70

(56) References Cited

U.S. PATENT DOCUMENTS

| | | | |
|---|---|---|---|
| 4,148,554 A | | 4/1979 | Magnusson et al. ...... 385/99 X |
| 4,290,668 A | | 9/1981 | Ellis et al. ................. 385/95 X |
| 4,697,861 A | * | 10/1987 | Mitchell ..................... 439/271 |
| 4,822,128 A | * | 4/1989 | Imoto et al. .................. 385/43 |
| 5,430,818 A | * | 7/1995 | Hartl et al. ................... 385/51 |
| 6,488,317 B1 | * | 12/2002 | Daoud ......................... 285/322 |
| 2002/0071637 A1 | * | 6/2002 | Centanni et al. ............. 385/51 |
| 2005/0031271 A1 | * | 2/2005 | Saccomanno ................ 385/88 |

FOREIGN PATENT DOCUMENTS

| | | | |
|---|---|---|---|
| DE | 299 13240 U1 | 3/2000 | ............... 385/99 X |
| WO | WO 82/02604 A | 8/1982 | ............... 385/31 X |
| WO | WO 02/101289 A2 | 12/2002 | ............... 385/24 X |

OTHER PUBLICATIONS

PCT International Search Report; PCT/US2004/000510; Jun. 2, 2004.

* cited by examiner

Primary Examiner—Brian M. Healy
(74) Attorney, Agent, or Firm—Kurt Luther; James W. Falk

(57) ABSTRACT

A fiber optic coupler comprises a metal tube and a clear hollow silicone insert, with a tapered region including a first set of grabbers and a constant area region including a second set of grabbers. A tapered optical element is coupled to an optical fiber, when both the tapered optical element and the optical fiber are mechanically secured by crimping the metal tube and the silicone insert in the proximity of the first and second sets of grabbers, as by using a standard crimper tool.

15 Claims, 3 Drawing Sheets

COUPLING A TAPERED OPTICAL ELEMENT TO AN OPTICAL FIBER

BACKGROUND OF THE INVENTION

1. Technical Field

This invention relates to the field of fiber optic illumination and more specifically to a coupler suitable for attaching a tapered optical element to an optical fiber.

2. Background Art

While there are methods known for coupling fiber optic cables to one another, such methods have proven to be unsuitable for coupling a tapered optical element, such as a morphing concentrator, to an optical fiber. There is therefore a need to be able to cost effectively couple an optical fiber to a tapered non-imaging optical element especially for non-imaging optics applications.

SUMMARY OF THE INVENTION

The present invention describes an apparatus and method of using a coupler to couple a tapered optical element to an optical fiber. In a preferred embodiment, the inventive coupler comprises a hollow silicone insert in a metal tube that is used to align an optical fiber and a tapered non-imaging optical element. A crimp tool deforms the metal tube and the coupler enough to fix the fiber and non-imaging optic in alignment. The silicone insert enables direct contact with the non-imaging optic without loss of total internal reflection. In accordance with my invention, the silicone insert includes "grabber features" to clamp around the parts. Advantageously, an index-matching medium is in contact with the opposing faces of the parts, reducing the fresnel reflection loss from 8% to less than 1%.

According to a first aspect, the present invention provides a fiber optic coupler for a tapered optical element comprising:

a metal tube having an inner circumferential surface, a first open circular end and a second open circular end;

a clear hollow insert having a refractive index less than the tapered optical element is positioned within and abutting the inner circumferential surface of the metal tube;

the hollow insert being comprised of:

an input tapered region extending from the first open circular end for a first predetermined distance along a central axis, the tapered region including a first plurality of grabbers wherein each one of the first plurality of grabbers extends radially from the inner circumferential surface of the metal tube and the first plurality of grabbers collectively define a first portion of a cone extending from the first open circular end, a coupling region, starting at the first predetermined distance from the first open circular end and extending a second predetermined distance along the central axis, the radial thickness of the coupling region defining a second portion of the cone extending from the first open circular end, and a constant area region starting at the second predetermined distance from the first open circular end and extending to the second open circular end along the central axis, the constant area region including a second plurality of grabbers wherein each one of the second plurality of grabbers extends radially a from the inner circumferential surface for a third predetermined distance.

According to a second aspect, the present invention provides a method for coupling a tapered optic element to an optical fiber comprising the steps of:

positioning a clear silicone insert upon an inner circumferential surface of a metal tube having a first open circular end and a second open circular end;

forming an input tapered region from said clear silicone insert, said tapered region including a first plurality of grabbers extending radially from the inner circumferential surface of said metal tube;

forming a coupling region, from said clear silicone insert, said coupling region starting at a first predetermined distance from said first open circular end and extending a second predetermined distance along a central axis of said metal tube;

forming a constant area region, from said clear silicone insert, said constant area region including a second plurality of grabbers extending radially from the inner circumferential surface of said metal tube;

inserting said tapered optical element into said first open circular end of said metal tube and in contact with said first plurality of grabbers;

inserting said optical fiber into said second open circular end of said metal tube and in contact with said second plurality of grabbers; and crimping said metal tube in order to mechanically secure the tapered optical element and the optical fiber.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the scope and spirit of the invention will become apparent to those of skill in the art from the detailed description of the invention and claims that follow.

DETAILED DESCRIPTION OF THE INVENTION

Mode(s) for Carrying Out the Invention

Figure 1:
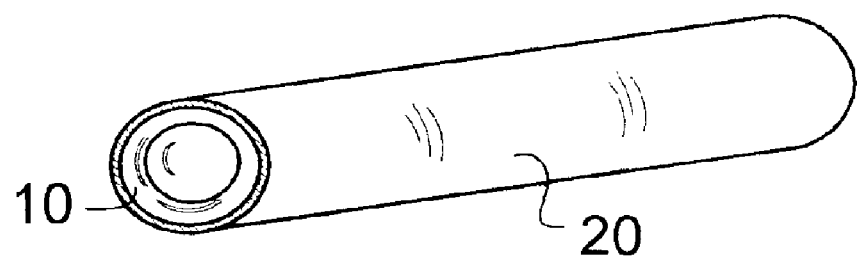
FIG. 1 illustrates a fiber optic coupler in accordance with one specific illustrative embodiment of the present invention.

Referring first to FIG. 1, a fiber optic coupler in accordance with one embodiment of my invention comprises a clear hollow insert 10, composed of a material such as silicone, within a deformable tube 20. The material used for the clear hollow insert advantageously has a lower refractive index than the tapered optical element or a coating of a lower refractive index is provided between the hollow insert 10 and the tapered optical element to prevent light leakage. In one particular embodiment, tube 20 is of metal and has an outer diameter of 5.7 millimeters and an inner diameter of 5.2 millimeters.

Figure 2:
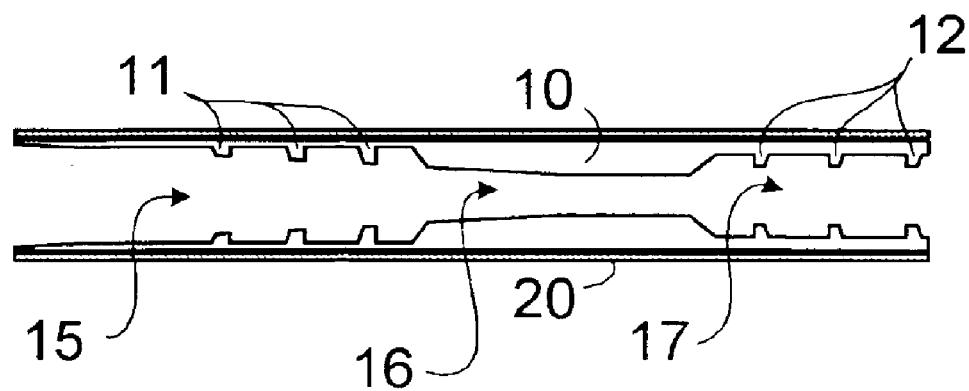
FIG. 2 depicts the internal structure of the fiber optic coupler of FIG. 1, before its use in accordance with my invention.

FIG. 2 shows the internal structure of the fiber optic coupler of FIG. 1, before its use as a coupling element. The clear hollow insert 10 is composed of an input tapered region 15, a coupling region 16, and a constant area region 17 and advantageously is a molded part positioned against the inner surface of the metal tube 20. The input tapered region 15 is defined by a first set of grabbers 11, which are progressively closer together. Each one of the first set of grabbers 11 extends radially from the inner circumferential surface of the metal tube 20 and collectively defines a first portion of a cone. Advantageously, the taper of this cone matches the taper of the tapered optical element.

The output constant area region 17 is defined by a second set of grabbers 12, which are equi-spaced from each other. Each one of the second set of grabbers 12 extends radially from the inner circumferential surface for a predetermined distance. Advantageously, this predetermined distance matches the diameter of the optical fiber.

Advantageously, these grabber regions provide crimp zones, as described below, which allow the use of a standard crimp tool such as the CrimpAll series produced by Paladin.

Figure 3:
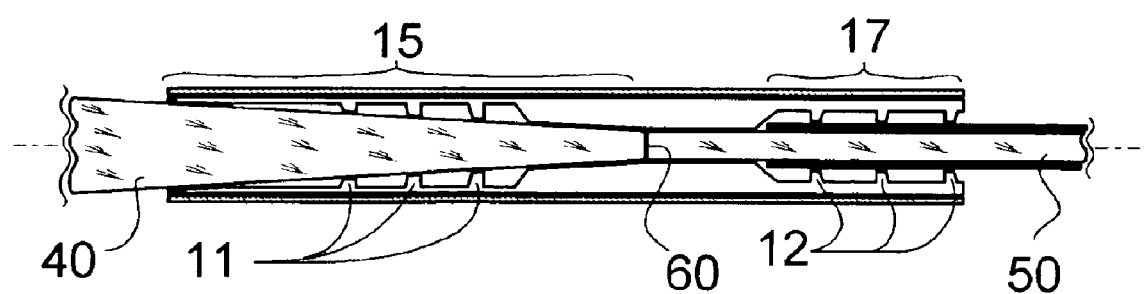
FIG. 3 shows a tapered optical element being optically connected to an optical fiber using a first embodiment of the fiber optic coupler of my invention, prior to crimping.

Refering now to FIG. 3, there is depicted a fiber optic coupler, prior to a crimping operation, comprising the metal tube 20 and clear hollow insert 10. As described above, the clear hollow insert is made up of the tapered region 15 including the first set of grabbers 11, the coupling region, and the constant area region 17 including the second set of grabbers 12. A tapered optical element 40 is positioned next to a fiber optic cable 50 within my inventive coupler. The tapered optical element 40 is inserted into the input tapered region 15 and the fiber optic cable 50 is inserted into the constant area region 17 through the opposite end of the coupler. Both the tapered optical element 40 and the fiber cable 50 protrude into the coupling region 16, where the material of the clear hollow insert has enough flex to accommodate a portion of the tapered optical element 40. An index-matching medium 60 is positioned between the mating faces of the tapered optical element 40 and the optical fiber 50.

In one preferred embodiment, the index-matching medium is microencapsulated silicone 60 that is injected into the center of the coupler during manufacturing, and does not cure or dry-out prior to use. Upon contact from faces of the opposing optics, the encapsulant ruptures, and the index-coupling medium makes contact with the optics. In this preferred embodiment, the index matching medium 60 is inserted at the optical interface between a face of the tapered optical element 40 and a corresponding face of the optical fiber 50.

In another embodiment, the index-matching medium is a thin membrane of silicone that is part of the clear hollow insert 10. Upon crimping, sufficient energy is imparted to the membrane to allow it to flow sufficient to provide the coupling medium.

Figure 4:
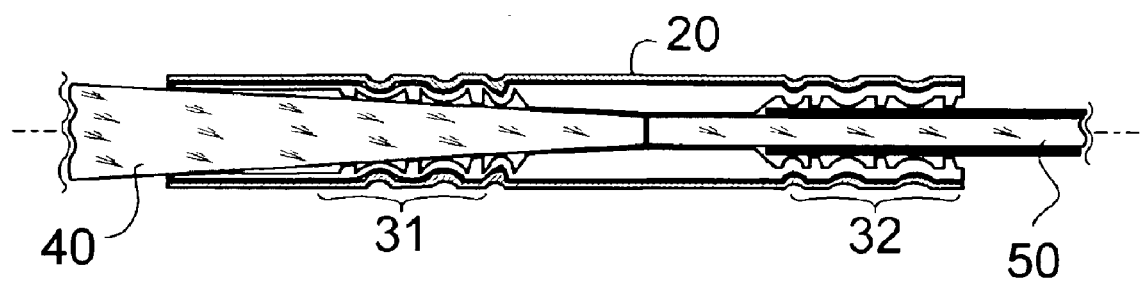
FIG. 4 shows the fiber optic coupler of FIG. 3, after crimping.

Refer now to FIG. 4, which depicts my inventive coupler after the crimping operation. After the tapered optical element 40 and the fiber optic cable 50 are inserted into the coupler, they are mechanically secured by crimping the metal tube 20 and the coupler 10 at a first crimp zone 31 and a second crimp zone 32.

Figure 5:
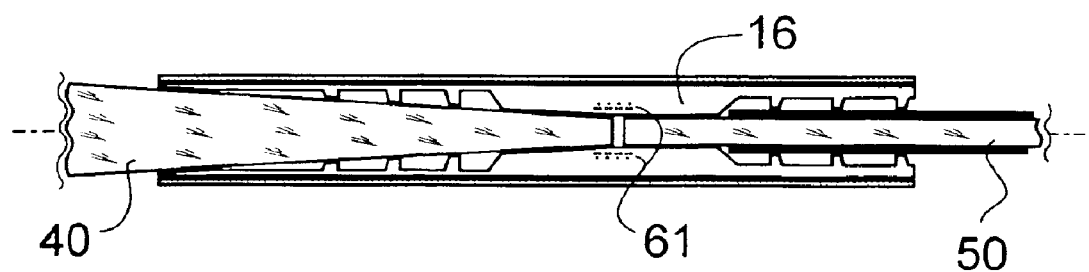
FIG. 5 shows a tapered optical element being optically connected to an optical fiber using a second embodiment of the fiber optic coupler of my invention, prior to crimping.
Figure 6:
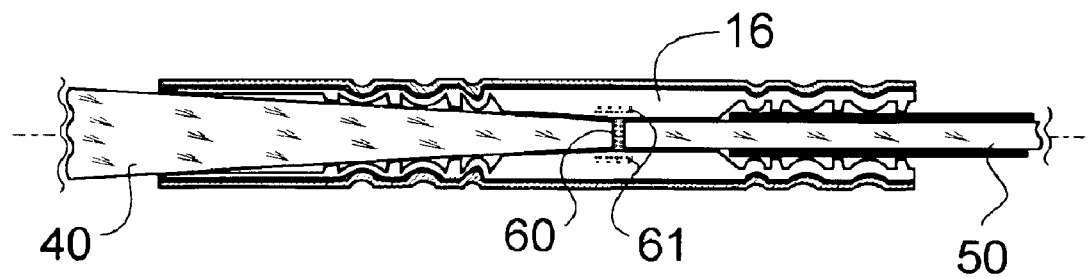
FIG. 6 shows the fiber optic coupler of FIG. 5, after crimping.

FIG. 5 shows a second embodiment of my invention in which microencapsulated silicone 61 is embedded in, or injected into, the coupling region 16 of the clear hollow insert. During the crimping process, certain of the microcapules are broken and release index-matching silicone 60 as shown in FIG. 6. This index-matching silicone 60 optically connects the opposing faces of the tapered optical element 40 and the optical fiber 50.

A tapered optical element is coupled to an optical fiber using my inventive coupler using the following steps. First, a tapered optical element 40 is inserted into the first open circular end of the coupler and in contact with the first set of grabbers 11. Next, an optical fiber 50 is inserted the second open circular end of the coupler and in contact with the second set of grabbers 12. Finally, the metal tube 20, comprising the outside of the coupler, is crimped to mechanically secure the tapered optical element 40 and the optical fiber 50.

Alternate Embodiments

Alternate embodiments may be devised without departing from the spirit or the scope of the invention.

What is claimed is:

1. A fiber optic coupler for coupling a tapered optical element, said coupler comprising:
   a metal tube having an inner circumferential surface, a first open circular end, a second open circular end, and a central axis; and
   a clear hollow insert, positioned within the inner circumferential surface of said metal tube, said hollow insert including;
      an input tapered region extending from said first open circular end for a first predetermined distance along said central axis, said tapered region including a first plurality of grabbers, each one of said first plurality of grabbers extending radially from said inner circumferential surface of said metal tube and said first plurality of grabbers collectively defining a first portion of a cone extending from said first open circular end,
      a coupling region, starting at said first predetermined distance from said first open circular end and extending a second predetermined distance along said central axis, the radial thickness of said coupling region defining a second portion of said cone extending from said first open circular end, and
      a constant area region extending to said second open circular end along said axis, said constant area region including a second plurality of grabbers wherein each one of said second plurality of grabbers extends radially from said inner circumferential surface for a third predetermined distance.

2. The coupler of claim 1 in combination with a tapered optical element inserted into said first open circular end and an optical fiber inserted into said second open circular end wherein said metal tube is deformed in order to fix the tapered optical element and the fiber in alignment.

3. The combination of claim 2 further comprising an index-matching medium in optical communication with opposing faces of said tapered optical element and said optical fiber.

4. The combination of claim 3 wherein said index-matching medium is microencapsulated silicone.

5. The coupler of claim 1 wherein said metal tube has an outer diameter of about 5.7 millimeters and an inner diameter of about 5.2 millimeters.

6. The coupler of claim 1 wherein said clear hollow insert is composed of silicone.

7. A method for coupling a tapered optic element to an optical fiber comprising the steps of:

positioning a clear hollow insert having a lower refractive index than said tapered optical element within the inner circumferential surface of a deformable tube having a first open circular end and a second open circular end, said clear hollow insert having;

an input tapered region including a first plurality of grabbers extending radially from the inner circumferential surface of said deformable tube, a coupling region starting at a first predetermined distance from said first open circular end and extending a second predetermined distance along a central axis of said deformable tube, and a constant area region including a second plurality of grabbers extending radially from the inner circumferential surface of said deformable tube;

inserting said tapered optical element into said first open circular end of said deformable tube and in contact with said first plurality of grabbers;

inserting said optical fiber into said second open circular end of said deformable tube and in contact with said second plurality of grabbers; and crimping said deformable tube at said first and second plurality of grabbers to mechanically secure the tapered optical element and the optical fiber.

8. The method of claim 7 further comprising the step of:

providing an index matching medium between a face of said tapered optical element and a corresponding face of said optical fiber.

9. The method of claim 7 wherein the step of crimping said deformable tube further comprises the steps of:

a) crimping said deformable tube at a first crimp zone in the proximity of said first plurality of grabbers, thereby mechanically securing said tapered optical element; and b) crimping said deformable tube at a second crimp zone in the proximity of said second plurality of grabbers, thereby mechanically securing said optical fiber.

10. The method of claim 6 wherein the deformable tube is a metal tube and the clear hollow insert is a molded silicone part and said step of positioning comprises:

inserting the molded part to be in contact with the inner circumferential surface of the metal tube.

11. A fiber optic coupler for coupling a tapered optical input to an optical fiber output, said coupler comprising:

a deformable tube; and a hollow silicone insert positioned within said tube and abutting the inner surface of said tube, said silicone insert including, a tapered input region having a first set of grabbers extending radially inward and within which the tapered optical input will extend, a constant radius output region having a second set of grabbers extending radially inward and within which the optical fiber output will extend, and a coupling region between said tapered input and said constant radius output regions and within which opposing surfaces of the tapered optical input and the optical fiber output will be together.

12. The fiber coupler of claim 11 wherein the taper of the tapered input region of the silicone insert matches the taper of the tapered optical input.

13. The fiber coupler of claim 12 wherein the grabbers of said first set are progressively closer together towards said coupling region.

14. The fiber coupler of claim 13 wherein the grabbers of said second set are equi-spaced from each other in said constant radius output region.

15. The fiber coupler of claim 11 wherein said deformable tube is of metal and said hollow silicone insert is a molded part inserted into and abutting the inner surface of said metal tube.

\* \* \* \* \*